United States Patent
Wu

(10) Patent No.: US 12,016,056 B2
(45) Date of Patent: Jun. 18, 2024

(54) RANDOM ACCESS PROCESSING METHOD AND APPARATUS, TERMINAL, NETWORK DEVICE, AND STORAGE MEDIUM

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 483 days.

(21) Appl. No.: 17/400,641

(22) Filed: Aug. 12, 2021

(65) Prior Publication Data

US 2021/0378028 A1 Dec. 2, 2021

Related U.S. Application Data

(63) Continuation of application No. PCT/CN2020/075025, filed on Feb. 13, 2020.

(30) Foreign Application Priority Data

Feb. 14, 2019 (CN) .......................... 201910114793.2

(51) Int. Cl.
  *H04W 74/08* (2009.01)
  *H04W 74/00* (2009.01)
  *H04W 74/0833* (2024.01)
  *H04W 76/18* (2018.01)

(52) U.S. Cl.
  CPC ..... *H04W 74/0841* (2013.01); *H04W 74/008* (2013.01); *H04W 76/18* (2018.02)

(58) Field of Classification Search
  CPC ......... H04W 74/0841; H04W 74/0833; H04W 74/008; H04W 74/002; H04W 74/006; H04W 76/18; H04W 76/19; H04W 76/15; H04W 76/10
  See application file for complete search history.

(56) References Cited

U.S. PATENT DOCUMENTS

| | | | |
|---|---|---|---|
| 2011/0299415 A1 | 12/2011 | He et al. | |
| 2014/0241285 A1* | 8/2014 | Pang | H04W 74/0833 370/329 |
| 2015/0003363 A1 | 1/2015 | Shi et al. | |
| 2018/0110074 A1* | 4/2018 | Akkarakaran | H04W 72/21 |
| 2020/0252973 A1* | 8/2020 | Zhang | H04W 74/0841 |
| 2020/0404711 A1 | 12/2020 | Zhao et al. | |

(Continued)

FOREIGN PATENT DOCUMENTS

| | | | | |
|---|---|---|---|---|
| CA | 3049040 A1 * | 7/2018 | ............. | H04L 69/28 |
| CN | 101841889 A | 9/2010 | | |

(Continued)

OTHER PUBLICATIONS

Japanese Office Action related to Application No. 2021-547114 dated Jul. 26, 2022.

(Continued)

*Primary Examiner* — Phong La

(74) *Attorney, Agent, or Firm* — von Briesen & Roper, s.c.

(57) ABSTRACT

A random access processing method, an apparatus, a terminal, a network device, and a storage medium are provided. The random access processing method includes: reporting random access process information corresponding to a type of a random access process to a network side.

20 Claims, 6 Drawing Sheets

(56) References Cited

U.S. PATENT DOCUMENTS

2021/0337597 A1 10/2021 Yoshimura
2021/0378028 A1* 12/2021 Wu .................... H04W 74/008

FOREIGN PATENT DOCUMENTS

| | | | | |
|---|---|---|---|---|
| CN | 101969662 A | 2/2011 | | |
| CN | 103581961 A | 2/2014 | | |
| CN | 108271275 A | 7/2018 | | |
| CN | 111194093 B | * 12/2022 | ........... | H04L 5/0053 |
| CN | 111565470 B | * 3/2023 | ............ | H04W 52/36 |
| JP | 2012518297 A | 8/2012 | | |
| WO | 20180139575 A1 | 8/2018 | | |

OTHER PUBLICATIONS

R1-1800727—Source: Motorola Mobility, "Physical channel design for 2-step RACH", Agenda Item: 7.1.4.1, Document for: Discussion and decision, 3GPP TSG RAN WG1 Meeting AH 1801, Vancouver, Canada, Jan. 22-26, 2018.

R1-1811067—Source: OPPO, "Two-steps RACH procedure for NR-U", Agenda Item: 11.2.1.1. Document for: Discussion, Decision, 3GPP TSG RAN WG2 Meeting #103, Gothenberg, Sweden, Aug. 20, 2018-Aug. 24, 2018.

International Search Report & Written Opinion related to Application No. PCT/CN2020/075025; dated Aug. 26, 2021.

Extended European Search Report related to Application No. 20755227.4; dated Mar. 17, 2022.

Chinese Office Action related to Application No. 201910114793.2; dated Feb. 14, 2022.

R1-1901192—Source: Nokia, Nokia Shanghai Bell "On 2-step Random Access Procedure", Agenda item: 7.2.14, Document for: Discussion, 3GPP TSG RAN WG1 Ad-Hoc Meeting 1901, Taipei, Taiwan, Jan. 21-25, 2019.

R2-104676—Source: Huawei, China Unicom "UE RACH failure reporting", Agenda item: 4.3.1.3, Document for: Discussion and Decision, 3GPP TSG RAN WG2 Meeting #71, Madrid, Spain, Aug. 23-Aug. 27, 2010.

* cited by examiner

RANDOM ACCESS PROCESSING METHOD AND APPARATUS, TERMINAL, NETWORK DEVICE, AND STORAGE MEDIUM

CROSS-REFERENCE OF RELATED APPLICATION

This application is a continuation application of a PCT Application No. PCT/CN2020/075025 filed on Feb. 13, 2020, which claims priority to Chinese Patent Application No. 201910114793.2 filed in China on Feb. 14, 2019, the disclosures of which are incorporated herein by reference in their entireties.

TECHNICAL FIELD

The embodiments of the present disclosure relate to the field of communication, and in particular, to a random access processing method and apparatus, a terminal, a network device, and a storage medium.

BACKGROUND

After a terminal triggers a random access process, the terminal can choose from multiple different types of random access processes. For example, after the terminal triggers the random access process, the terminal first selects a message A (MsgA) resource of a new 2-step random access process (2-Step RACH) to initiate the random access process. When attempt of the new 2-step random access process fails, the terminal can select a message 1 (Msg1) resource of a traditional 4-step random access process, for example, select a physical random access channel (PRACH) resource of the traditional 4-step random access process to initiate the random access process.

If the random access process initiated by the terminal fails, the terminal records the failure information as a part of a radio link failure report (rlf-Report). Then, when the terminal initiates connection re-establishment, the terminal indicates whether there is a radio link failure report in a connection re-establishment complete message, that is, the connection re-establishment complete message includes indication information indicating whether there is a radio link failure report (rlf-InfoAvailable). After a network side receives the information, if the network side needs to obtain the radio link failure report, the network side sends request information (rlf-ReportReq) to request the terminal to report the radio link failure report. The terminal reports the radio link failure report to the network side according to the request information of the network side.

Content of the Radio Link Failure Report Includes:
(1) Type of a failure, such as a random access failure or a physical layer failure;
(2) Geographical location information, such as global navigation satellite system (GNSS) coordinates; and
(3) Identifier of a primary cell where a failure occurs.

Although the terminal records failure information as a part of the radio link failure report, a problem of abnormal connection between the terminal and the network cannot be solved.

SUMMARY

The embodiments of the present disclosure provide a random access processing method and apparatus, a terminal, a network device, and a storage medium.

According to a first aspect, some embodiments of the present disclosure further provide a random access processing method. The method includes:
reporting random access process information corresponding to a type of a random access process to a network side.

According to a second aspect, some embodiments of the present disclosure provide a random access processing method. The method includes:
receiving random access process information corresponding to a type of a random access process from a terminal; and
modifying configuration information of the random access process according to the random access process information.

According to a third aspect, some embodiments of the present disclosure provide a random access processing apparatus. The apparatus includes:
an information reporting module, configured to report random access process information corresponding to a type of a random access process to a network side if a result of the random access process is generated.

According to a fourth aspect, some embodiments of the present disclosure provide a random access processing apparatus. The apparatus includes:
an information receiving module, configured to receive random access process information corresponding to a type of a random access process from a terminal; and
an information modifying module, configured to modify configuration information of the random access process according to the random access process information.

According to a fifth aspect, some embodiments of the present disclosure provide a terminal, including a processor, a memory, and a computer program stored in the memory and executable on the processor. When the computer program is executed by the processor, steps of the foregoing random access processing method are implemented.

According to a sixth aspect, some embodiments of the present disclosure provide a network device, including a processor, a memory, and a computer program stored in the memory and executable on the processor. When the computer program is executed by the processor, steps of the foregoing random access processing method are implemented.

According to a seventh aspect, some embodiments of the present disclosure provide a computer-readable storage medium. The computer-readable storage medium stores a computer program, and when the computer program is executed by a processor, the steps of the foregoing random access processing method are implemented.

BRIEF DESCRIPTION OF DRAWINGS

It may be better understood from the following descriptions of specific implementations of the present disclosure with reference to the accompanying drawings that same or similar reference numerals represent same or similar features in the present disclosure.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
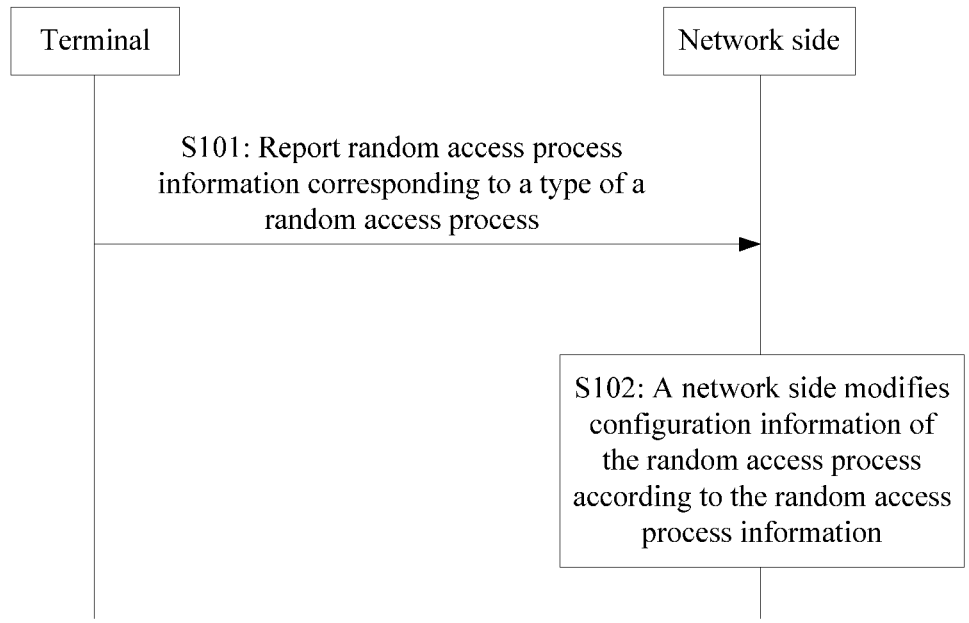
FIG. 1 is a schematic flowchart of a random access processing method according to an embodiment of the present disclosure.

FIG. 1 is a schematic flowchart of a random access processing method according to an embodiment of the present disclosure. As shown in FIG. 1, the random access processing method includes S101 and S102.

S101: A terminal reports random access process information corresponding to a type of a random access process to a network side. A network side device can be a base station or a core network device.

S102: The network side modifies configuration information of the random access process according to the random access process information. That is, the random access process information is used to instruct to modify the configuration information of the random access process.

The type of the random access process includes one or a combination of multiple of the following: a new 2-step random access process, a traditional 4-step random access process, a traditional 2-step random access process, and a random access process for time information calibration.

The following is detailed description of each type of random access process.

Figure 2:
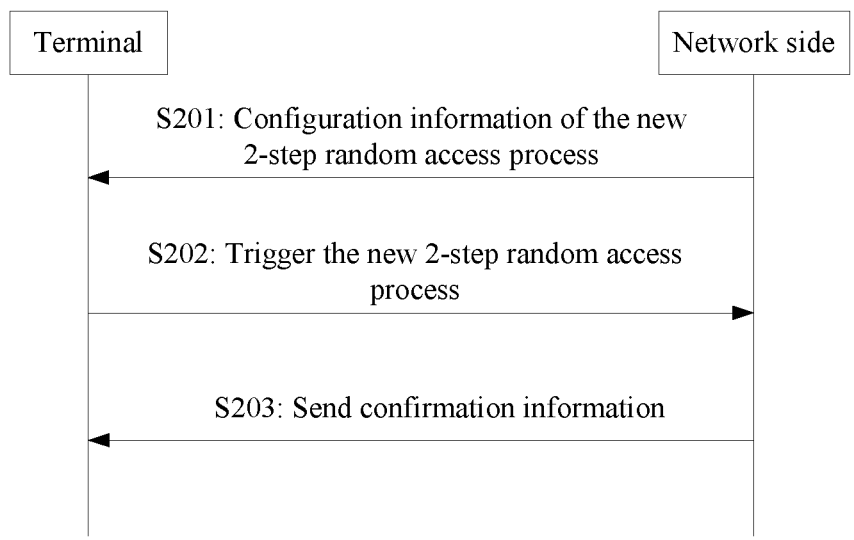
FIG. 2 is a schematic flowchart of a new 2-step random access process according to an embodiment of the present disclosure.

As shown in FIG. 2, the new 2-step random access process includes S201 to S203.

S201: A network side configures configuration information of a new 2-step random access process for a terminal, where the configuration information includes sending resource information corresponding to message A (MsgA) and sending resource information corresponding to message B.

S202: The terminal triggers the new 2-step random access process. The terminal sends MsgA to the network side, for example, sends data information of MsgA through a physical uplink shared channel (PUSCH). The terminal sends MsgA through a PRACH. MsgA includes data and an ID of the terminal.

S203: The network side sends a message B (MsgB) to the terminal, where MsgB may include contention resolution information corresponding to data information of MsgA. If the terminal fails to receive MsgB, the terminal re-triggers the new 2-step random access process. When the MsgB of the new 2-step random access process only includes a preamble identifier of MsgA of the terminal, and does not include information for contention resolution, for example, MsgB of the new 2-step random access process does not include a media access control element (MAC CE) for contention resolution, the terminal falls back to the traditional random access process, for example, uses uplink grant information in MsgB to send message 3 (Msg3) of the traditional 4-step random access process.

The traditional random access process is mainly divided into contention-free random access and contention-based random access, where contention-free random access is also called the traditional 2-step random access process, and contention-based random access is also called the traditional 4-step random access process.

Figure 3:
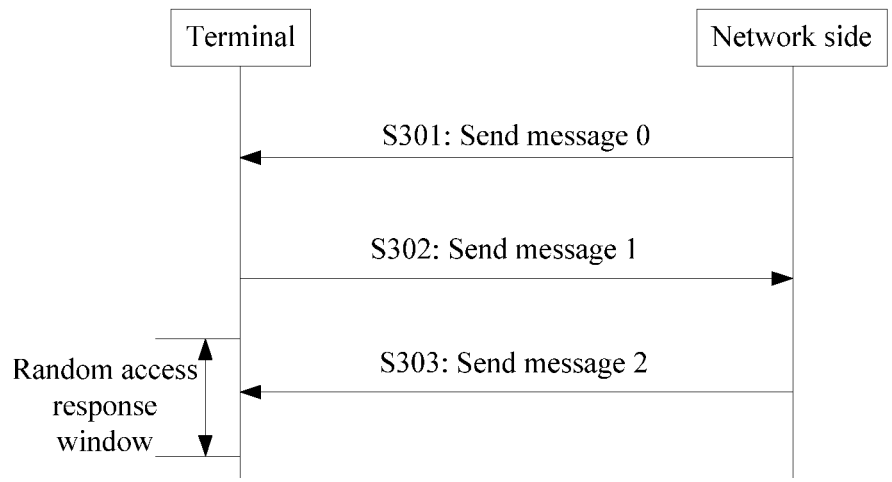
FIG. 3 is a schematic flowchart of a traditional 2-step random access process according to an embodiment of the present disclosure.

As shown in FIG. 3, the traditional 2-step random access process includes S301 to S303.

S301: A network side sends message 0 (Msg0) to a terminal, where the network side allocates a dedicated random access resource for contention-free random access to the terminal, and the dedicated random access resource is a random access preamble.

S302: The terminal sends a designated dedicated random access signal message 1 (Msg1) to the network side on a designated random access resource according to the random access resource indicated by Msg0. After the terminal sends Msg1, the terminal calculates identifier information of scheduling message 2 (Msg2) of the network side according to the sending time of Msg1 and a frequency location, where the identifier information is a random access radio network temporary identity (RA-RNTI). The calculation method of RA-RNTI is as follows:

$$RA\text{-}RNTI=1+t\_id+10 \times f\_id$$

t_id is a subframe identifier of a random access signal, and f_id is a frequency domain identifier of a random access signal.

After the terminal sends Msg1, the terminal monitors a downlink channel in a fixed window to obtain feedback information Msg2 of the network side. The fixed window can be a random access response window (RAR window), a start position of the RAR window is 3 subframes plus a subframe where sending of the message 1 is completed, and a length of the RAR window is a length configured by the network.

S303: The network side sends Msg2 to the terminal, where the Msg2 is a random access response (RAR), and the random access response includes: Msg1 identifier information, uplink timing advance information (Timing Advance Command), uplink sending grant information (UL Grant), backoff information (Backoff Indicator), and a temporary cell radio network temporary identifier (Temporary C-RNTI). The Msg1 identifier information can be a random access preamble identity (Random Access Preamble ID, RAPID). If the terminal fails to receive a RAR, the terminal determines, according to backoff information indicated in the RAR, a next time for sending a random access response.

Figure 4:
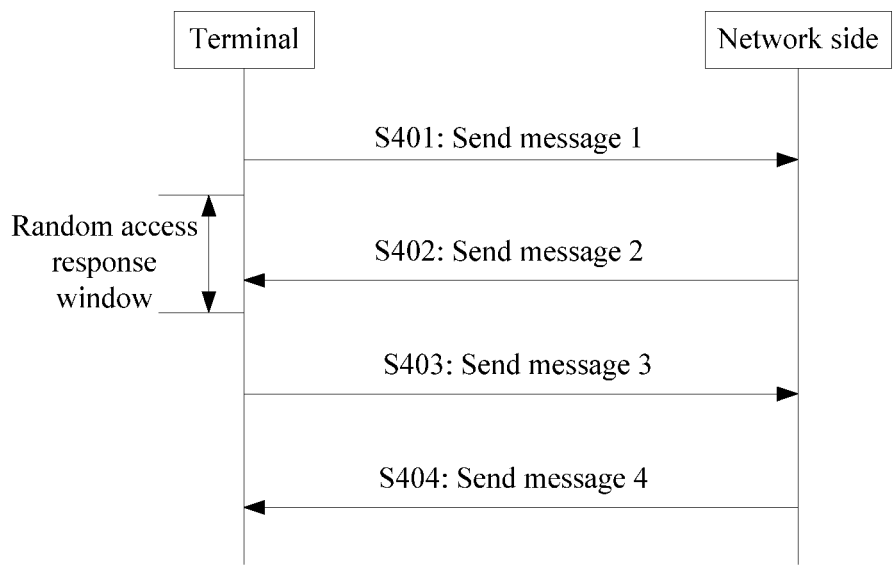
FIG. 4 is a schematic flowchart of a traditional 4-step random access process according to an embodiment of the present disclosure.

As shown in FIG. 4, the traditional 4-step random access process includes S401 to S404.

S401: A terminal selects a random access resource and uses the random access resource to send a selected random access signal to a network side, where the random access signal is message 1 (Msg1). The calculation method of a RA-RNTI and a random access response window is the same as the calculation method in a traditional 2-step random access process. This is not repeated herein.

S402: The network side receives Msg1, calculates a timing advance (TA), and sends a random access response to the terminal, where the random access response is message 2 (Msg2), and the random access response includes at least timing advance information and an uplink scheduling grant (UL grant) for message 3 (Msg3).

S403: The terminal performs uplink transmission based on the UL grant specified by Msg2, where the content of Msg3 uplink transmission is different under different random access trigger conditions. For example, for initial access, Msg3 is used to transmit a radio resource control (RRC) connection establishment request.

S404: The network side sends message 4 (Msg4) to the terminal, where the message 4 is a contention resolution message, and the terminal can determine, according to Msg4, whether the random access is successful.

The description of the random access process for time information calibration is as follows:

In a communication system, the network sends a system message to the terminal, for example, the system message is a system information block (SIB) 16. The system message can indicate a reference time, for example, the reference time is Treference; where the reference time can include one or a combination of multiple of the following: a coordinated universal time (UTC), a daylight saving time (DST), a global positioning system (GPS) time, and a local time.

When the terminal receives the reference time, to ensure that a terminal side time and a network side time are understood in the same way, a protocol specifies that a time position corresponding to the reference time received by the terminal is: a boundary of a system frame number (SFN) where an end boundary of a system message sending window of the system message is located. For example, the position of the SIB16 where the terminal receives the reference time information is (SFN_2, Subframe_1), and the system message sending window of the SIB16 is 10 subframes (subframe, there are 10 subframes in 1 SFN). In this case, the end boundary of the system message window corresponding to SIB16 where the terminal receives the reference time information is (SFN_3, Subframe_1), and the receiving reference time of the terminal corresponds to the end boundary time of SFN_3.

The time information provided by the network side to the terminal comes from a specific clock source. For example: for a GPS time provided by the network side to the terminal, a clock source of the GPS time is a GPS satellite; for a UTC time provided by the network side to the terminal, a clock source of the UTC time can be an atomic clock that is connected to the network side device (such as a base station or a core network device) and that can provide a UTC time. Different clock sources can provide the same or different types of time information, such as both clock source 1 and clock source 2 can provide a UTC time. When different clock sources provide the same or different types of time information, the accuracy of the time information provided can be the same or different, for example, a granularity (or precision) of a UTC time provided by clock source 1 is 1 second, while a granularity (or precision) of a UTC time provided by clock source 2 is 1 microsecond.

When the network side provides the reference time to the terminal, due to the impact of an air interface transmission delay, the time point when the terminal receives the reference time of the network side is inconsistent with the time point when the network actually sends the reference time. When the terminal requires a higher-precision (such as 1 microsecond) reference time, the terminal can obtain uplink timing information by initiating a contention-free random access process. The uplink timing information can be more precise than that in the traditional random access process. Based on the higher-precision uplink timing, the terminal can calculate the air interface transmission delay (for example, TA/2 is the air interface transmission delay), to correct the received reference time based on the calculated air interface transmission delay, for example, the actual time of the reference time information received by the terminal= (reference time information received by the terminal-(TA/2)). The network side can configure new (or independent) random access configuration information for the new random access process (the new random access process is the random access process used for time information calibration), so that the terminal initiates the random access process for time information calibration.

In some embodiments of the present disclosure, by reporting the random access process information corresponding to the type of the random access process to correct configuration information of the random access process, the configuration information of the random access process can be optimized based on the type of the random access process, to solve the problem of abnormal connection between the terminal and the network. Further, when the random access process fails, the configuration information of the random access process is optimized, so that the connection between the terminal and the network can be re-established, ensuring a normal operation of a communication service.

Figure 5:
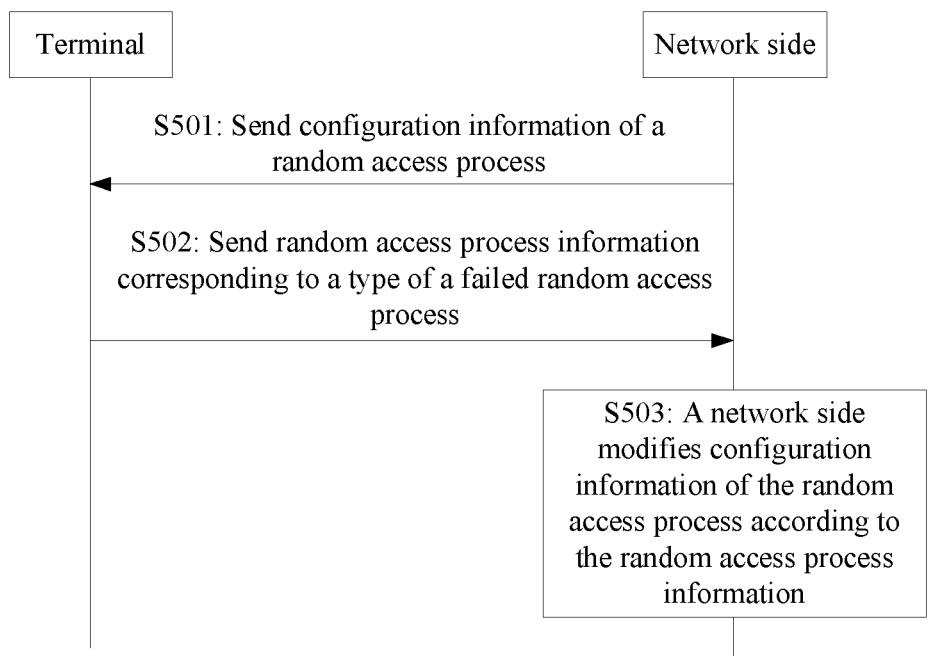
FIG. 5 is a schematic flowchart of a random access processing method according to another embodiment of the present disclosure.

FIG. 5 is a schematic flowchart of a random access processing method according to another embodiment of the present disclosure. As shown in FIG. 5, the random access processing method includes S501 to S503.

S501: A terminal initiates a random access process according to configuration information of the random access process configured by a network side.

S502: If the random access process initiated by the terminal fails, the terminal sends random access process information corresponding to a type of the failed random access process to a network side.

As an example, the terminal sends a random access request message to the network side. If the number of times the random access request message is sent is equal to or greater than a threshold configured by the network, the random access process initiated by the terminal fails. For example, if a value PREAMBLE_TRANSMISSION_COUNTER counted by a transmission quantity counter of Msg1 or MsgA exceeds the threshold "preambleTransMax" configured by the network, the random access process initiated by the terminal fails. The terminal records the random access process information corresponding to the type of the random access process and reports the random access process information corresponding to the type of the random access process to the network side.

The random access process information includes one or a combination of multiple of the following: random access process type information, random access process trigger event information, random access process record information, geographic location information of the terminal, measurement information of the terminal, speed information of the terminal, and identifier information of the terminal.

The following is detailed description of each piece of random access process information.

1. The random access process type information includes one or a combination of multiple of the following: a new 2-step random access process, a traditional 4-step random access process, a traditional 2-step random access process, and a random access process for time information calibration.
2. The random access process trigger event information includes one or a combination of multiple of the following:
   (1) initial access, for example, random access initiated by the terminal in an RRC_IDLE state;
   (2) connection re-establishment, for example, RRC connection re-establishment triggered by a radio link failure of the terminal;
   (3) cell switching, for example, the network side sends a switching command to switch the terminal from cell 1 to cell 2;
   (4) information that downlink data arrives and an uplink of the terminal is in an out-of-synchronization state; for example, when downlink data of a high-priority service arrives and an uplink of the terminal is in an out-of-synchronization state;
   (5) information that uplink data arrives and an uplink of the terminal is in an out-of-synchronization state; for example, when uplink data of a high-priority service arrives and an uplink of the terminal is in an out-of-synchronization state;
   (6) a state of the terminal changes, for example, the terminal enters a connected state from the RRC_INACTIVE state;
   (7) establish uplink synchronization for a secondary cell (SCell 1), for example, SCell 1 of the terminal has independent uplink synchronization timing and the base station triggers the terminal to initiate the random access process to obtain the uplink timing advance (TA) of the Scell.
   (8) system information request, for example, the terminal requests the network side to send SIBS; and
   (9) beam failure recovery, for example, a beam failure occurs in the terminal.
3. The following is description of the random access process record information.

If the random access process includes the new 2-step random access process, the random access process record information includes record information of the new 2-step random access process. In this embodiment, because the new 2-step random access process is a failed random access process, record information of the new 2-step random access process is failure process record information.

If the random access process includes the traditional 4-step random access process, the random access process record information includes record information of the traditional 4-step random access process. In this embodiment, because the traditional 4-step random access process is a failed random access process, record information of the traditional 4-step random access process is failure process record information.

If the random access process includes the traditional 2-step random access process, the random access process record information includes record information of the traditional 2-step random access process. In this embodiment, because the traditional 2-step random access process is a failed random access process, record information of the traditional 2-step random access process is failure process record information.

If the random access process includes both the new 2-step random access process and the traditional 4-step random access process, the random access process record information includes at least one of the following: record information of the new 2-step random access process, record information of the traditional 4-step random access process, and total record information of the new 2-step random access process and the traditional 4-step random access process. In this embodiment, if both the new 2-step random access process and the traditional 4-step random access process are failed random access processes, total record information is total failure process record information of the new 2-step random access process and the traditional 4-step random access process.

In an embodiment of the present disclosure, the record information of the new 2-step random access process includes one or a combination of multiple of the following:
(1) the number of times MsgA is sent;
(2) the number of times sending of MsgA fails or the number of times receiving of MsgB fails;
(3) the number of times sending of control information of MsgA fails, or the number of times receiving of a response message corresponding to the control information of MsgA fails, for example, the number of times receiving of a RAPID corresponding to the control information of MsgA fails;
(4) the number of times sending of control information of MsgA succeeds, or the number of times receiving of a response message corresponding to the control information of MsgA succeeds, for example, the number of times receiving of a RAPID corresponding to the control information of MsgA succeeds;
(5) the number of times sending of data information of MsgA fails, or the number of times receiving of a response message corresponding to data information of MsgA fails, for example, the number of times receiving of contention resolution information corresponding to data information of MsgA fails;
(6) the number of times sending of data information of MsgA succeeds, or the number of times receiving of a response message corresponding to data information of MsgA succeeds, for example, the number of times receiving of contention resolution information corresponding to data information of MsgA succeeds;
(7) indication information indicating whether contention occurs is detected;
(8) the number of times contention is detected, and
(9) channel access failure information.

The condition for determining that sending of MsgA fails includes: the contention resolution information corresponding to the data information of MsgA is not received when MsgB is received (for example, within a receiving time window of the random access response message). For example, in the receiving time window of the random access response message, the contention resolution information corresponding to the data information of MsgA is not received.

The condition for determining that sending of control information of MsgA fails includes: a control information identifier of MsgA is not received when MsgB is received. For example, the condition for determining that sending of control information of MsgA fails includes: a RAPID is not received within the receiving time window of the random access response message.

The condition for determining that sending of control information of MsgA succeeds includes: a control information identifier of MsgA is received in MsgB. For example, a RAPID is received in MsgB.

The condition for determining that sending of data information of MsgA fails includes: the contention resolution information corresponding to the data information of MsgA is not received when MsgB is received (for example, within a receiving time window of the random access response message). For example, in the receiving time window of the random access response message, the contention resolution information corresponding to the data information of MsgA is not received.

The condition for determining that contention is detected: the contention resolution information corresponding to the data information of MsgA is not received when MsgB is received. For example, in the receiving time window of the random access response message, the contention resolution information corresponding to the data information of MsgA is not received.

The condition for determining that sending of data information of MsgA succeeds includes: contention resolution information corresponding to the data information of MsgA is received in MsgB.

With respect to a channel access failure, for an unlicensed band, before sending a signal, a transmit end needs to monitor whether the band is occupied, and if the band is not occupied, the transmit end may send the signal. If the monitored band is occupied, the transmit end cannot send a signal. This can be called a channel access failure, or can be called a listen-before-talk failure (LBT failure).

The channel access failure information of the new 2-step random access process includes one or a combination of multiple of the following: indication information indicating whether sending of MsgA has a channel access failure, the number of times sending of MsgA has a channel access failure, indication information indicating whether sending of the control information of MsgA has a channel access failure, the number of times sending of the control information of MsgA has a channel access failure, indication information indicating whether sending of the data information of MsgA has a channel access failure, the number of times sending of the data information of MsgA has a channel access failure, indication information indicating whether receiving of MsgB has a channel access failure, the number of times receiving of MsgB has a channel access failure, and information about a frequency that has a channel access failure.

The information about the frequency that has a channel access failure includes one or a combination of multiple of the following: information about a frequency at which MsgA has a channel access failure, information about a frequency at which the control information of MsgA has a channel access failure, information about a frequency at which the data information of MsgA has a channel access failure, and information about a frequency at which MsgB has a channel access failure.

The information about the frequency includes one or a combination of multiple of the following: a frequency channel number identifier, a bandwidth identifier, a band identifier, a bandwidth part (BWP) identifier, and a cell identifier.

For example, the frequency channel number identifier is f1, the bandwidth identifier is 20 MHz, the band identifier is Band1, the bandwidth part identifier is BWP1, and the cell identifier is cell 1.

In an embodiment of the present disclosure, the record information of the traditional 4-step random access process includes one or any combination of multiple of the following:

(1) the number of times Msg1 is sent;
(2) the number of times sending of Msg1 fails, or the number of times receiving of Msg2 fails, or the number of times receiving of Msg4 fails;
(3) the number of times Msg3 is sent;
(4) the number of times sending of Msg3 fails or the number of times receiving of Msg4 fails;
(5) indication information indicating whether contention occurs is detected;
(6) the number of times contention is detected, and
(7) channel access failure information.

The condition for determining that sending of Msg1 fails includes any one of the following conditions:

The first condition: a control information identifier of Msg1 is not received when Msg2 is received. For example, in the receiving time window of the random access response message, the RAPID is not received.

The second condition: corresponding contention resolution information is not received when Msg4 is received. For example, in the contention resolution time window, the corresponding contention resolution information is not received.

The condition for determining that contention is detected includes any one of the following conditions:

The first condition: a control information identifier of Msg1 is not received when Msg2 is received. For example, in the receiving time window of the random access response message, the RAPID is not received.

The second condition: corresponding contention resolution information is not received when Msg4 is received. For example, in the contention resolution time window, the corresponding contention resolution information is not received.

The condition for determining that sending of Msg3 fails includes: the corresponding contention resolution information is not received when Msg4 is received. For example, in the contention resolution time window, the corresponding contention resolution information is not received.

The channel access failure information of the traditional 4-step random access process includes one or any combination of multiple of the following:

(1) indication information indicating whether sending of Msg1 has a channel access failure, or indication information indicating whether sending of Msg3 has a channel access failure;
(2) the number of times sending of Msg1 has a channel access failure, or the number of times sending of Msg3 has a channel access failure;
(3) indication information indicating whether receiving of Msg2 has a channel access failure, or indication information indicating whether receiving of Msg4 has a channel access failure;
(4) the number of times receiving of Msg2 has a channel access failure, or the number of times receiving of Msg4 has a channel access failure; and
(5) information about a frequency that has a channel access failure.

The information about the frequency that has a channel access failure includes one or a combination of multiple of the following: information about a frequency at which Msg1 has a channel access failure, information about a frequency at which Msg2 has a channel access failure, information about a frequency at which Msg3 has a channel access failure, and information about a frequency at which Msg4 has a channel access failure.

The information about the frequency includes one or a combination of multiple of the following: a frequency channel number identifier, a bandwidth identifier, a band identifier, a bandwidth part identifier, and a cell identifier.

For example, the frequency channel number identifier is f1, the bandwidth identifier is 20 MHz, the band identifier is Band1, the bandwidth part identifier is BWP1, and the cell identifier is cell 1.

In an embodiment of the present disclosure, the record information of the traditional 2-step random access process includes one or a combination of multiple of the following:
  (1) the number of times Msg1 is sent;
  (2) the number of times sending of Msg1 fails or the number of times receiving of Msg2 fails;
  (3) indication information indicating whether contention occurs is detected;
  (4) the number of times contention is detected, and
  (5) channel access failure information.

The condition for determining that sending of Msg1 fails includes: a control information identifier of Msg1 is not received when Msg2 is received. The condition for determining that sending of Msg1 fails includes: a RAPID of Msg1 is not received within the receiving time window of the random access response message.

The condition for determining that contention is detected includes: a control information identifier of Msg1 is not received when Msg2 is received. The condition for determining that contention is detected includes: a RAPID of Msg1 is not received within the receiving time window of the random access response message.

The channel access failure information of the traditional 2-step random access process includes one or a combination of multiple of the following: indication information indicating whether sending of Msg1 has a channel access failure, the number of times sending of Msg1 has a channel access failure, indication information indicating whether receiving of Msg2 has a channel access failure, the number of times receiving of Msg2 has a channel access failure, and information about a frequency that has a channel access failure.

The information about the frequency that has a channel access failure includes: information about a frequency at which Msg1 has a channel access failure and/or information about a frequency at which Msg2 has a channel access failure.

The information about the frequency includes one or a combination of multiple of the following: a frequency channel number identifier, a bandwidth identifier, a band identifier, a bandwidth part identifier, and a cell identifier.

For example, the frequency channel number identifier is f1, the bandwidth identifier is 20 MHz, the band identifier is Band1, the bandwidth part identifier is BWP1, and the cell identifier is cell 1.

In an embodiment of the present disclosure, the total record information of the new 2-step random access process and the traditional 4-step random access process includes one or a combination of multiple of the following:
  (1) the total number of times random access messages are sent, and the number of sending times includes a sum of the number of times MsgA is sent in the new 2-step random access process and the number of times Msg1 is sent in the traditional 4-step random access process;
  (2) the total number of times sending of a random access message fails, and the number of sending failure times includes a sum of the number of times sending of MsgA fails in the new 2-step random access process and the number of times sending of Msg1 fails in the traditional 4-step random access process;
  (3) the total number of times contention is detected, and the number of times of contention includes a sum of the number of times contention is detected in the new 2-step random access process and the number of times contention is detected in the traditional 4-step random access process;
  (4) indication information indicating whether the new 2-step random access process falls back to the traditional 4-step random access process is detected, and
  (5) the number of times the new 2-step random access process falls back to the traditional 4-step random access process.

The meaning of falling back from the new 2-step random access process to the traditional 4-step random access process is: the random access request message of the terminal is the MsgA sent in the new 2-step random access process. However, because the terminal has not received contention resolution information in MsgB, the terminal directly falls back to the traditional 4-step random access process and initiates Msg3.

For example, if the new 2-step random access process fails, the random access process information reported by the terminal includes: the number of times the new 2-step random access process is initiated, the type indication of the new 2-step random access process, the number of times MsgA is sent, the number of times sending of data information of MsgA succeeds or fails, the number of times sending of the control information of MsgA succeeds or fails, whether contention (or conflict) has been detected, the number of times contention (or conflict) is detected, whether there is indication information indicating fallback to the traditional 4-step random access process, the number of times of fallback to the traditional 4-step random access process, whether the detected contention (or conflict) is indication information detected when the MsgB of the new 2-step random access process is received, whether the detected contention (or conflict) is the indication information detected when Msg4 of the traditional 4-step random access process is received, the number of times contention (or conflict) is detected when MsgB of the new 2-step random access process is received, and the number of times contention (or conflict) is detected when Msg4 of the traditional 4-step random access process is received.

4. The geographic location information of the terminal includes one or any combination of multiple of the following:
  (1) The cell identifier information of the terminal, for example, the cell identifier information includes: a physical cell identifier (PCI), a cell global identifier (CGI), and a frequency channel number.
  (2) The coordinate location information of the terminal, for example, the coordinate location information includes global positioning system (GPS) coordinates.

5. The measurement information of the terminal includes one or a combination of multiple of the following:
  (1) measurement information of a serving cell or measurement information of a serving frequency channel number, for example, measurement information of serving cell 1 or measurement information of serving frequency channel number 1.
  (2) measurement information of a neighboring cell or measurement information of a neighboring frequency channel number, for example, measurement information of neighboring cell 1 or measurement information of neighboring frequency channel number 1.

(3) measurement information corresponding to a reference signal of a serving cell, or measurement information corresponding to a reference signal of a serving frequency channel number, or measurement information corresponding to a reference signal of a neighboring cell, or measurement information corresponding to a reference signal of a neighboring frequency channel number.

An example is measurement information of the synchronization signal block (SSB) 1 of cell 1, and measurement information of a channel state information reference signal (CSI-RS) 1 of cell 1.

(4) an identifier of a reference signal corresponding to a random access resource of a failed random access process. For example, the identifier is SSB1.

(5) measurement information of a reference signal corresponding to a random access resource of a failed random access process. For example, the measurement information includes reference symbol received power (RSRP) of SSB1 and reference signal received quality (RSRQ) of SSB1.

(6) the number of identifiers of reference signals exceeding a threshold for reference signal selection configured by the network. For example, the RSRP threshold of the SSB configured on the network side is −20 dBm, the SSB identifiers that exceed the threshold are SSB1 and SSB2, and the number of SSB identifiers that exceed the threshold is 2.

(7) an identifier of a reference signal exceeding a threshold for reference signal selection configured by the network.

For example, the RSRP threshold configured on the network side is −20 dBm, the SSB identifiers that exceed the threshold are SSB1 and SSB2, and the number of SSB identifiers that exceed the threshold is 2.

The reference signal includes: an SSB and/or a CSI-RS.

The measurement information includes one or any combination of multiple of the following: RSRP, RSRQ, a received signal strength indicator (RSSI), a channel busy ratio (CBR), and a channel occupancy ratio (CR).

6. The identifier information of the terminal includes one or any combination of multiple of the following: an international mobile subscriber identity (IMSI), a temporary mobile subscriber identity (TMSI), a system architecture evolution temporary mobile subscription identifier (SAE TMSI, S-TMSI for short), 5G_S_TMSI, and a radio network temporary identity (RNTI).

S503: The network side modifies configuration information of the random access process according to the random access process information.

Further, the random access processing method further can include: a network node on the network side receives the random access process information, and sends the random access process information to another network node. For example, the base station gNB1 receives the random access process information, and sends the random access process information to a base station gNB2 corresponding to cell 1 having the random access.

Figure 6:
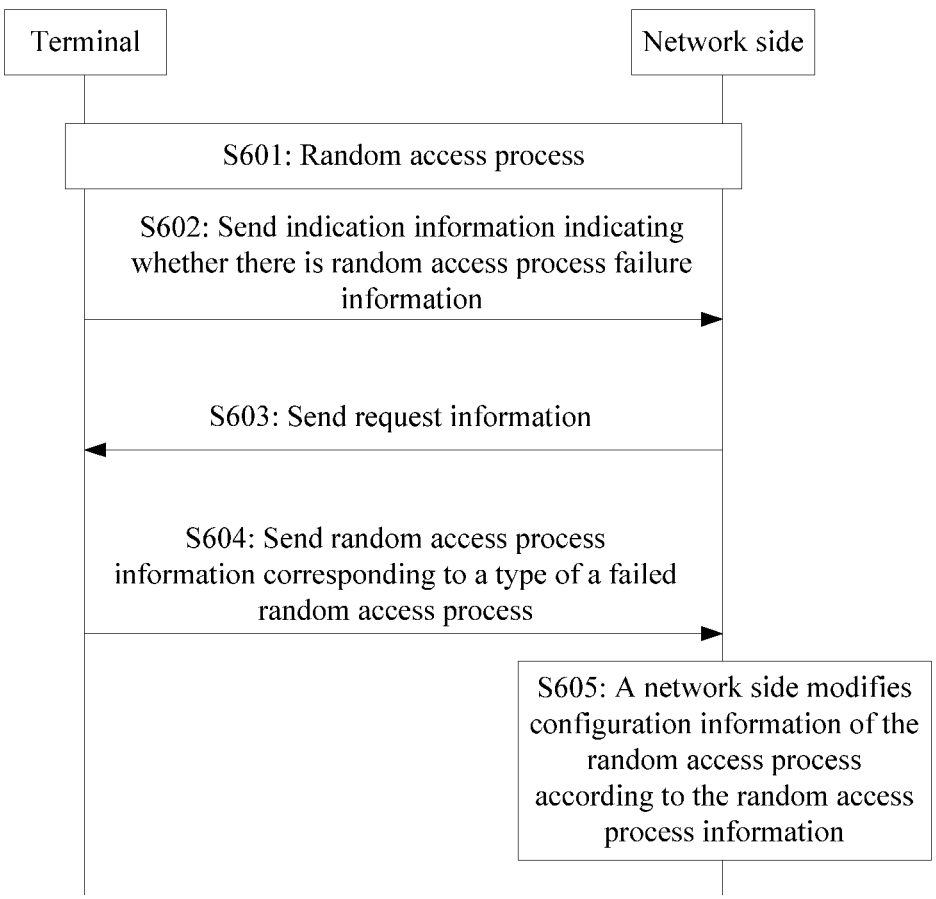
FIG. 6 is a schematic flowchart of a random access processing method according to still another embodiment of the present disclosure.

FIG. 6 is a schematic flowchart of a random access processing method according to still another embodiment of the present disclosure. As shown in FIG. 6, the random access processing method includes S601 to S605.

S601: A terminal initiates a random access process according to configuration information of the random access process configured by a network side.

S602: The terminal sends indication information indicating whether there is random access process information of a failed random access process to the network side.

As an example, if the random access process initiated by the terminal fails, the terminal records random access process information corresponding to a type of the random access process to a network side, and sends indication information including random access process information to the network side.

That the terminal initiates the random access process includes the terminal sends a random access request message to the network side. If the number of times the random access request message is sent is equal to or greater than a threshold configured by the network, the random access process initiated by the terminal fails.

The terminal records the random access process information and indicates to the network side that there is random access process information to be reported. The terminal indicates, in an RRC connection re-establishment complete message, whether there is random access process information to be reported; or the terminal indicates, in an RRC connection recovery complete message, whether there is random access process information to be reported; or the terminal indicates, in an RRC connection establishment complete message, whether there is random access process information to be reported. For example, rlf-InfoAvailable indication information can be used to indicate whether there is random access process information to be reported.

S603: The network side sends request information to the terminal according to the indication information of S602, or the network side autonomously sends request information to the terminal. The request information is used to request the terminal to report the random access process information. For example, the network side sends rlf-ReportReq request information to the terminal.

S604: The terminal sends the random access process information to the network side according to the request information, where the random access process information is the random access process information of the failed random access process.

S605: The network side modifies configuration information of the random access process according to the random access process information.

Further, the random access processing method further includes: a network node on the network side receives the random access process information, and sends the random access process information to another network node. For example, the base station gNB1 receives the random access process information of the failed random access process, and sends the random access process information to a base station gNB2 corresponding to cell 1 having the random access.

Figure 7:
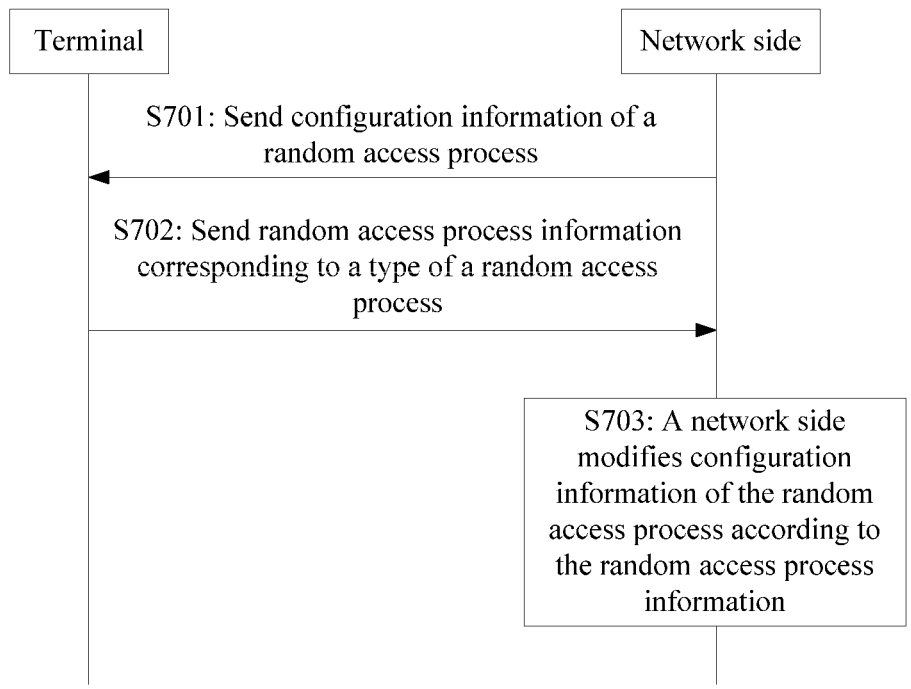
FIG. 7 is a schematic flowchart of a random access processing method according to yet another embodiment of the present disclosure.

FIG. 7 is a schematic flowchart of a random access processing method according to yet another embodiment of the present disclosure. As shown in FIG. 7, the random access processing method includes S701 to S703.

S701: A terminal initiates a random access process according to configuration information of the random access process configured by a network side.

S702: The terminal sends random access process information corresponding to a type of a random access process to a network side.

The random access process includes: a successfully completed random access process and/or a failed random access process. The successfully completed random access process may be a random access process configured in a network or specified in a protocol. The failed random access process may be a random access process configured by a network or specified in a protocol.

As an example, the terminal reports the random access process information of the random access process that fails most recently to the network side.

As another example, the terminal reports the random access process information of the random access process that fails most recently in a specific geographic location to the network side. As an example, the terminal reports the random access process information of the random access process that fails most recently in cell 1 to the network side.

It should be noted that the random access process information of the failed random access process has been described above, and will not be repeated herein.

As another example, the terminal reports the random access process information of the random access process that is successfully completed most recently to the network side.

As another example, the terminal reports the random access process information of the random access process that is successfully completed most recently in a specific geographic location to the network side. As an example, the terminal reports the random access process information of the random access process that is successfully completed most recently in cell 1 to the network side.

It should be noted that if the random access process includes the new 2-step random access process, the random access process record information includes record information of the new 2-step random access process; If the new 2-step random access process is a successful random access process, record information of the new 2-step random access process is success process record information.

If the random access process includes the traditional 4-step random access process, the random access process record information includes record information of the traditional 4-step random access process. If the traditional 4-step random access process is a successful random access process, record information of the traditional 4-step random access process is success process record information.

If the random access process includes the traditional 2-step random access process, the random access process record information includes record information of the traditional 2-step random access process. If the traditional 2-step random access process is a successful random access process, record information of the traditional 2-step random access process is success process record information.

If the random access process includes both the new 2-step random access process and the traditional 4-step random access process, the random access process record information includes at least one of the following: record information of the new 2-step random access process, record information of the traditional 4-step random access process, and total record information of the new 2-step random access process and the traditional 4-step random access process. If the new 2-step random access process and the traditional 4-step random access process are successful random access processes, the total record information is total success process record information of the new 2-step random access process and the traditional 4-step random access process.

Since the success process record information is the same as the failure process record information, the total success process record information is the same as the total failure process record information. This will not be repeated herein.

S703: The network side modifies configuration information of the random access process according to the random access process information.

In some embodiments of the present disclosure, if the random access process fails, the terminal sends random access process information of the failed random access process to a network side. In addition, if the random access process is successfully completed, the terminal reports the random access process information of the successfully completed random access process to the network side, so that the configuration information of the random access process can be modified to optimize the configuration information. For example, the number of random access processes initiated by the terminal to the network side is greater than a threshold. By optimizing the configuration information of the random access process, random access process failures can be reduced when the random access process is initiated next time. That is, the number of times the terminal initiates the random access process to the network side is reduced, so that the terminal can successfully complete the random access process as soon as possible.

The random access process information of the successfully completed random access process includes one or any combination of multiple of the following:

(1) random access process type information. For example, the type of the random access process includes the traditional 4-step random access process and/or new 2-step random access process.

It should be noted that the random access process type information of the successfully completed random access process is the same as the random access process type information of the failed random access process, and will not be repeated herein.

(2) random access process trigger event information. For example, a random access process trigger event of the terminal is initial access.

It should be noted that the random access process trigger event information of the successfully completed random access process is the same as the random access process trigger event information of the failed random access process, and will not be repeated herein.

(3) random access process record information. The random access process record information includes the number of attempts of the random access process, for example, the success process record information includes the number of times MsgA is sent.

It should be noted that the random access process record information of the successfully completed random access process is the same as the random access process record information of the failed random access process, and will not be repeated herein.

(4) geographic location information of the terminal. For example, the geographic location information of the terminal includes a serving cell identifier of the terminal.

It should be noted that geographic location information of the terminal of the successfully completed random access process is the same as geographic location information of the terminal of the failed random access process, and will not be repeated herein.

(5) measurement information of the terminal. For example, the measurement information of the terminal includes a RSRP measurement result of a serving cell of the terminal.

It should be noted that the measurement information of the terminal of the successfully completed random access process is the same as the measurement information of the terminal of the failed random access process, and will not be repeated herein.

(6) speed information of the terminal. For example, the speed information of the terminal includes the horizontal speed of the terminal and/or the vertical speed of the terminal, and the horizontal speed or vertical speed is 10 kilometers per second.

It should be noted that the speed information of the terminal of the successfully completed random access process is the same as the speed information of the terminal of the failed random access process, and will not be repeated herein.

(7) identifier information of the terminal. For example, the identifier information of the terminal includes a C-RNTI of the terminal.

It should be noted that the identification information of the terminal of the successfully completed random access process is the same as the identifier information of the terminal of the failed random access process, and will not be repeated herein.

Figure 8:
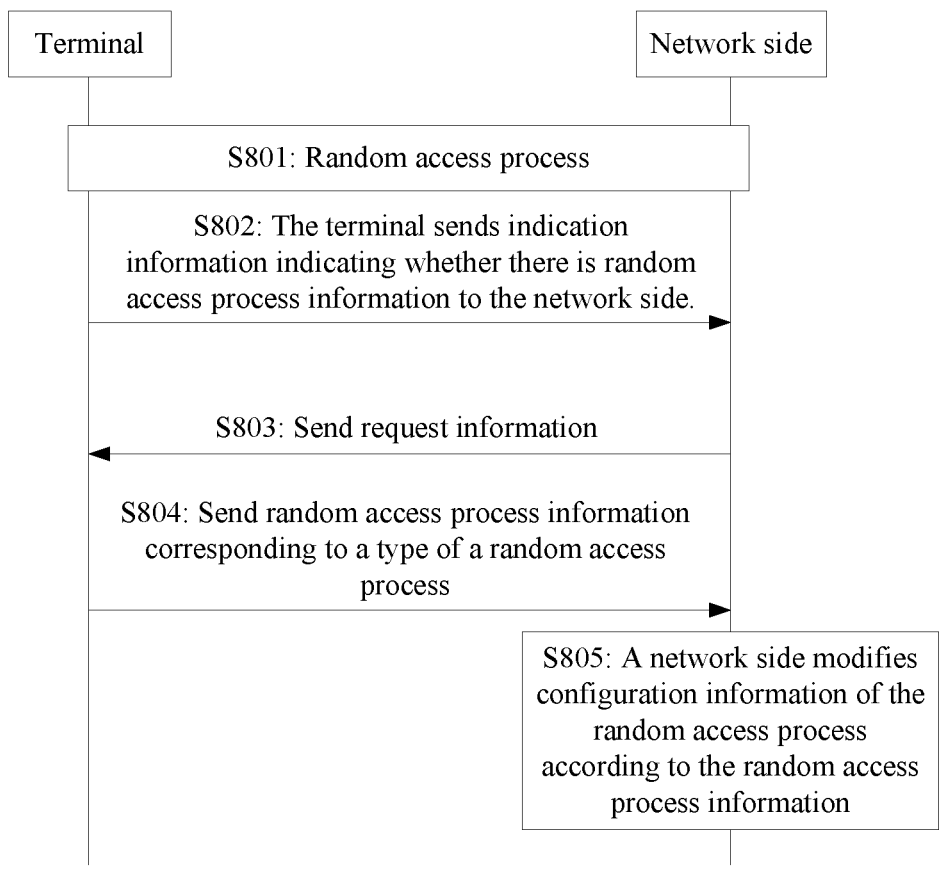
FIG. 8 is a schematic flowchart of a random access processing method according to yet another embodiment of the present disclosure.

FIG. 8 is a schematic flowchart of a random access processing method according to yet another embodiment of the present disclosure. As shown in FIG. 8, the random access processing method includes S801 to S805.

S801: A terminal initiates a random access process according to configuration information of the random access process configured by a network side.

S802: The terminal sends indication information indicating whether there is random access process information to the network side.

As an example, if the random access process initiated by the terminal fails, the terminal records random access process information of the failed random access process. If the terminal successfully completes the random access process, the terminal records random access process information of the successfully completed random access process.

It should be noted that the random access process information of the failed random access process and the random access process information of the successfully completed random access process are both random access process information corresponding to types of random access processes.

After the terminal records the random access process information, the terminal sends indication information including the random access process information to the network side.

S803: The network side sends request information to the terminal according to the indication information of S802, or the network side autonomously sends request information to the terminal. The request information is used to request the terminal to report the random access process information.

S804: The terminal sends random access process information corresponding to a type of a random access process to a network side. The random access process includes: a successfully completed random access process and a failed random access process.

S805: The network side modifies configuration information of the random access process according to the random access process information.

Further, the random access processing method further includes: a network node on the network side receives the random access process information, and sends the random access process information to another network node. For example, the base station gNB1 receives the random access process information of the failed random access process, and sends the random access process information to a base station gNB2 corresponding to cell 1 having the random access.

Figure 9:
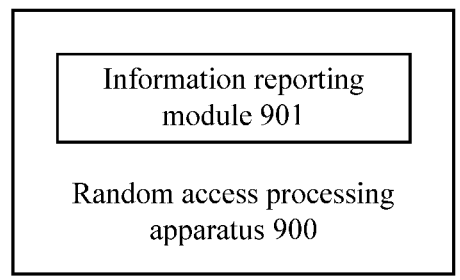
FIG. 9 is a schematic structural diagram of a random access processing apparatus according to an embodiment of the present disclosure.

FIG. 9 is a schematic structural diagram of a random access processing apparatus according to an embodiment of the present disclosure. The random access processing apparatus may be applied to a terminal side. As shown in FIG. 9, the random access processing apparatus 900 includes an information reporting module 901.

The information reporting module 901 is configured to report random access process information corresponding to a type of a random access process to a network side.

In an embodiment of the present disclosure, the random access processing apparatus 900 also includes a first determining module.

The first determining module is configured to: if a control information identifier of message A is not received when message B is received, determine that sending of the control information of message A fails.

In an embodiment of the present disclosure, the random access processing apparatus 900 further includes a second determining module.

The second determining module is configured to: if a control information identifier of message A is received when message B is received, determine that sending of the control information of message A succeeds.

In an embodiment of the present disclosure, the random access processing apparatus 900 further includes a third determining module.

The third determining module is configured to: if contention resolution information corresponding to the data information of message A is not received when message B is received, determine that at least one of the following cases occurs: sending of message A fails, sending of data information of message A fails, or contention is detected.

In an embodiment of the present disclosure, the random access processing apparatus 900 further includes a fourth determining module.

The fourth determining module is configured to: if contention resolution information corresponding to the data information of message A is received when message B is received, determine that sending of the data information of message A succeeds.

In an embodiment of the present disclosure, the random access processing apparatus 900 further includes a fifth determining module.

The fifth determining module is configured to: if at least one of the following conditions is met, determine that sending of message 1 fails; where the first condition is that a control information identifier of message 1 is not received when message 2 is received, and the second condition is that corresponding contention resolution information is not received when message 4 is received.

In an embodiment of the present disclosure, the random access processing apparatus 900 further includes a first detection module.

The first detection module is configured to: if at least one of the following conditions is met, detect contention; where the first condition is that a control information identifier of message 1 is not received when message 2 is received, and the second condition is that corresponding contention resolution information is not received when message 4 is received.

In an embodiment of the present disclosure, the random access processing apparatus 900 further includes a seventh determining module.

The seventh determining module is configured to: if corresponding contention resolution information is not received when message 4 is received, determine that sending of message 3 fails.

In an embodiment of the present disclosure, the random access processing apparatus 900 further includes an eighth determining module.

The eighth determining module is configured to: if a control information identifier of message 1 is not received when message 2 is received, determine that sending of message 1 fails.

In an embodiment of the present disclosure, the random access processing apparatus 900 further includes a second detection module.

The second detection module is configured to: if a control information identifier of message 1 is not received when message 2 is received, detect contention.

In an embodiment of the present disclosure, the random access processing apparatus 900 further includes an access process fallback module.

The access process fallback module is configured to: if message A of the new 2-step random access process is sent to the network side and contention resolution information in message B is not received, fall from the new 2-step random access process back to the traditional 4-step random access process.

It should be noted that, in the content of the method corresponding to the random access processing apparatus, the random access process information has been described in detail, and the details are not repeated herein.

Figure 10:
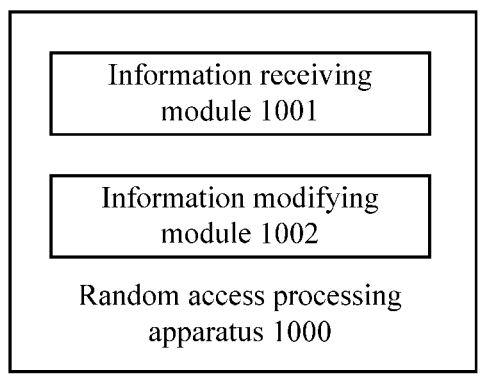
FIG. 10 is a schematic structural diagram of a random access processing apparatus according to another embodiment of the present disclosure.

FIG. 10 is a schematic structural diagram of a random access processing apparatus according to another embodiment of the present disclosure. The random access processing apparatus is applied to a network side. As shown in FIG. 10, the random access processing apparatus 1000 includes an information receiving module 1001 and an information modifying module 1002.

The information receiving module 1001 is configured to receive random access process information corresponding to a type of a random access process from a terminal.

The information modifying module 1002 is configured to modify configuration information of the random access process according to the random access process information.

In an embodiment of the present disclosure, the random access processing apparatus 1000 further includes an information forwarding module.

The information forwarding module is configured to send the random access process information to another network node.

It should be noted that, in the content of the method corresponding to the random access processing apparatus, the random access process information has been described in detail, and the details are not repeated herein.

Figure 11:
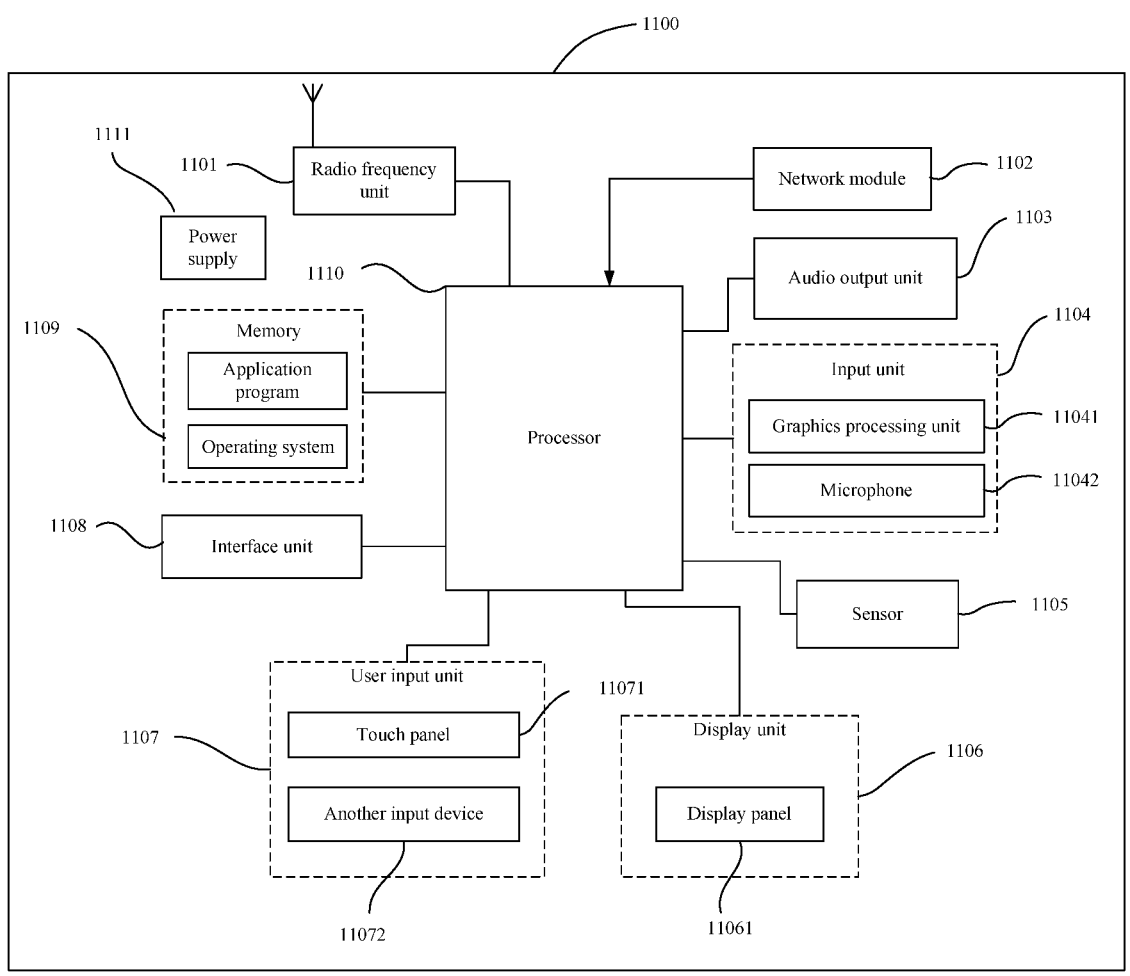
FIG. 11 is a schematic diagram of a hardware structure of a terminal implementing some embodiments of the present disclosure.

FIG. 11 is a schematic diagram of a hardware structure of a terminal implementing some embodiments of the present disclosure.

As shown in FIG. 11, terminal 1100 includes but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, a power supply 1111, and the like. Those skilled in the art may understand that the terminal structure shown in FIG. 11 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 1101 is configured to report random access process information corresponding to a type of a random access process to a network side.

In some embodiments of the present disclosure, by reporting the random access process information corresponding to the type of the random access process, the configuration information of the random access process can be optimized based on the type of the random access process. Further, when the random access process fails, the configuration information of the random access process is optimized, so that the connection between the terminal and the network can be re-established, ensuring a normal operation of a communication service.

It should be understood that in some embodiments of this disclosure, the radio frequency unit 1101 may be configured to receive and send signals in a process of receiving and sending information or calling. Specifically, the radio frequency unit 1101 receives downlink data from a network side for processing by the processor 1110, and sends uplink data to the network side. Generally, the radio frequency unit 1101 includes, but is not limited to, an antenna, at least one amplifier, a transceiver, a coupler, a low noise amplifier, a duplexer, and the like. In addition, the radio frequency unit 1101 may further communicate with another device by using a wireless communications system and network.

The terminal provides wireless broadband Internet access to a user through the network module 1102, for example, helps the user receive and send e-mails, browse web pages, and access streaming media.

The audio output unit 1103 may convert audio data received by the radio frequency unit 1101 or the network module 1102 or stored in the memory 1109 into an audio signal, and output the audio signal into sound. Moreover, the audio output unit 1103 may further provide audio output (for example, call signal receiving sound and message receiving sound) related to a specific function performed by the terminal 1100. The audio output unit 1103 includes a loudspeaker, a buzzer, a receiver, and the like.

The input unit 1104 is configured to receive audio or video signals. The input unit 1104 may include a graphics processing unit (GPU) 11041 and a microphone 11042. The graphics processing unit 11041 processes image data of a static image or a video obtained by an image capturing apparatus (for example, a camera) in a video capturing mode or an image capturing mode. A processed image frame can be displayed on the display unit 1106. The image frame processed by the graphics processing unit 11041 may be stored in the memory 1109 (or another storage medium) or sent through the radio frequency unit 1101 or the network module 1102. The microphone 11042 can receive a sound and can process the sound into audio data. The processed audio data may be converted, in a call mode, into a format that can be sent to a mobile communication base station by using the radio frequency unit 1101.

The terminal 1100 further includes at least one sensor 1105, such as a light sensor, a motion sensor, and another sensor. Specifically, the light sensor includes an ambient light sensor and a proximity sensor. The ambient light sensor can adjust a brightness of a display panel 11061 based on a brightness of ambient light. The proximity sensor can close the display panel 11061 and/or backlight when the terminal 1100 moves to an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1106 is configured to display information entered by a user or information provided for the user. The display unit 1106 may include the display panel 11061, and the display panel 11061 may be configured in a form of a liquid crystal display (LCD), an organic light-emitting diode (OLED), or the like.

The user input unit 1107 may be configured to receive inputted digit or character information and generate key signal input related to user setting and function control of the terminal. Specifically, the user input unit 1107 includes a touch panel 11071 and another input device 11072. The touch panel 11071, also known as a touch screen, can collect a touch operation performed by a user on or near the touch panel (for example, an operation performed by the user on the touch panel 11071 or near the touch panel 11071 with any suitable object or accessory such as a finger or a stylus). The touch panel 11071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 1110, receives a command sent by the processor 1110, and executes the command. In addition, the touch panel 11071 may be implemented by using a plurality of types such as a resistive type, a capacitive type, an infrared ray, and a surface acoustic wave. In addition to the touch panel 11071, the user input unit 1107 may also include another input device 11072. Specifically, the another input device 11072 may include but is not limited to a physical keyboard, a function key (such as a volume control key or a power on/off key), a trackball, a mouse, a joystick, and the like. Details are not described herein.

Further, the touch panel 11071 can cover the display panel 11061. When detecting a touch operation on or near the touch panel 11071, the touch panel 11071 transmits the touch operation to the processor 1110 to determine a type of a touch event. Then the processor 1110 provides a corresponding visual output on the display panel 11061 based on the type of the touch event. In FIG. 11, the touch panel 11071 and the display panel 11061 are used as two independent components to implement input and output functions of the terminal. However, in some embodiments, the touch panel 11071 and the display panel 11061 may be integrated to implement the input and output functions of the terminal. This is not specifically limited herein.

The interface unit 1108 is an interface connecting an external apparatus to the terminal 1100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 1108 can be configured to receive an input (for example, data information and power) from the external apparatus and transmit the received input to one or more elements in the terminal 1100, or transmit data between the terminal 1100 and the external apparatus.

The memory 1109 may be configured to store a software program as well as every kind of data. The memory 1109 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 1109 may include a high-speed random access memory, and may further include a non-volatile memory such as at least one magnetic disk storage component, a flash memory component, or another volatile solid-state storage component.

The processor 1110 is a control center of the terminal, and connects all parts of the entire terminal by using various interfaces and lines. By running or executing a software program and/or a module stored in the memory 1109 and invoking data stored in the memory 1109, the processor performs various functions of the terminal and data processing, to perform overall monitoring on the terminal. The processor 1110 may include one or more processing units. Optionally, the processor 1110 may integrate an application processor and a modem processor. The application processor mainly deals with an operating system, a user interface, an application program, and the like. The modem processor mainly deals with wireless communication. It may be understood that, alternatively, the modem processor may not be integrated into the processor 1110.

The terminal 1100 may further include a power supply 1111 (such as a battery) that supplies power to each component. Optionally, the power supply 1111 may be logically connected to the processor 1110 by using a power management system, to implement functions such as charging, discharging, and power consumption management by using the power management system.

In addition, the terminal 1100 includes some functional modules not shown. Details are not described herein.

Some embodiments of the present disclosure further provide a network device, which may include a base station. The network device includes a processor, a memory, and a computer program that is stored in the memory and that can run on the processor. When the processor executes the computer program, the foregoing processes of embodiments of the random access processing method are implemented and a same technical effect can be achieved. To avoid repetition, details are not described herein again.

Some embodiments of the present disclosure further provide a computer-readable storage medium. A computer program is stored in the computer-readable storage medium. When being executed by a processor, the computer program implements each process of the embodiment of the foregoing random access processing method, and a same technical effect can be achieved. To avoid repetition, details are not described herein. The computer readable storage medium is, for example, a read-only memory (ROM for short), a random access memory (RAM for short), a magnetic disk, or an optical disk.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more limitations, an element defined by "including a . . . " does not preclude the existence of other identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

It can be understood that those embodiments described in the embodiments of the present disclosure can be implemented by hardware, software, firmware, middleware, microcode, or a combination thereof. For implementation with hardware, the module, unit, submodule, subunit, and the like may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes can be stored in the memory and executed by the processor. The memory may be implemented in the processor or outside the processor.

Therefore, the objective of the present disclosure may also be implemented by running a program or a group of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A random access processing method, comprising:
reporting random access process information corresponding to a type of a random access process to a network side;
wherein the random access process information comprises one or a combination of multiple of the following: random access process type information, random access process trigger event information, and random access process record information;
wherein
if the type of the random access process comprises the new 2-step random access process, the random access process record information comprises record information of the new 2-step random access process;
if the type of the random access process comprises the traditional 4-step random access process, the random access process record information comprises record information of the traditional 4-step random access process;
if the type of the random access process comprises the traditional 2-step random access process, the random access process record information comprises record information of the traditional 2-step random access process; and
if the type of the random access process comprises the new 2-step random access process and the traditional 4-step random access process, the random access process record information comprises at least one of the following: record information of the new 2-step random access process, record information of the traditional 4-step random access process, and total record information of the new 2-step random access process and the traditional 4-step random access process,
wherein the record information of the new 2-step random access process comprises one or a combination of multiple of the following: the number of times message A is sent, the number of times sending of message A fails, the number of times receiving of message B fails, the number of times sending of control information of message A fails, the number of times receiving of a response message corresponding to the control information of message A fails, the number of times sending of control information of message A succeeds, the number of times receiving of a response message corresponding to the control information of message A succeeds, the number of times sending of data information of message A fails, the number of times receiving of a response message corresponding to data information of message A fails, the number of times sending of data information of message A succeeds, the number of times receiving of a response message corresponding to data information of message A succeeds, indication information indicating whether contention occurs is detected, the number of times contention is detected, and channel access failure information; wherein the channel access failure information comprises one or a combination of multiple of the following: indication information indicating whether sending of message A has a channel access failure, the number of times sending of message A has a channel access failure, indication information indicating whether sending of the control information of message A has a channel access failure, the number of times sending of the control information of message A has a channel access failure, indication information indicating whether sending of the data information of message A has a channel access failure, the number of times sending of the data information of message A has a channel access failure, indication information indicating whether receiving of message B has a channel access failure, the number of times receiving of message B has a channel access failure, and information about a frequency that has a channel access failure; wherein the record information of the traditional 4-step random access process comprises one or a combination of multiple of the following: the number of times message 1 is sent, the number of times sending of message 1 fails, the number of times receiving of message 2 fails, the number of times receiving of message 4 fails, the number of times message 3 is sent, the number of times sending of message 3 fails, indication information indicating whether contention occurs is detected, the number of times contention is detected, and channel access failure information; wherein the channel access failure information comprises one or a combination of multiple of the following: indication information indicating whether sending of message 1 has a channel access failure, indication information indicating whether sending of message 3 has a channel access failure, the number of times sending of message 1 has a channel access failure, the number of times sending of message 3 has a channel access failure, indication information indicating whether receiving of message 2 has a channel access failure, indication information indicating whether receiving of message 4 has a channel access failure, the number of times receiving of message 2 has a channel access failure, the number of times receiving of message 4 has a channel access failure, and information about a frequency that has a channel access failure; wherein the record information of the traditional 2-step random access process comprises one or a combination of multiple of the following: the number of times message 1 is sent, the number of times sending of message 1 fails, the number of times receiving of message 2 fails, indication information indicating whether contention occurs is detected, the number of times contention is detected, and channel access failure information; wherein the total record information comprises: a sum of the number of times message A is sent in the new 2-step random access process and the number of times message 1 is sent in the traditional 4-step random access process, a sum of the number of times sending of message A fails in the new 2-step random access process and the number of times sending of message 1 fails in the traditional 4-step random access process, a sum of the number of times contention is detected in the new 2-step random access process and the number of times contention is detected in the traditional 4-step random access process, indication information indicating whether the new 2-step random access process falls back to the traditional 4-step random access process is detected, and the number of times the new 2-step random access process falls back to the traditional 4-step random access process.

2. The random access processing method according to claim 1, wherein the random access process type information comprises one or a combination of multiple of the following: a new 2-step random access process, a traditional 4-step random access process, a traditional 2-step random access process, and a random access process for time information calibration; and/or wherein the random access process trigger event information comprises one or a combination of multiple of the following: initial access, connection re-establishment, cell switching, downlink data arrives and an uplink of the terminal is in an out-of-synchronization state, uplink data arrives and an uplink of the terminal is in an out-of-synchronization state, terminal state switch, establishing uplink synchronization for a secondary cell, system information request, and beam failure recover; and/or wherein the random access process information further comprises one or a combination of multiple of the following: geographic location information of the terminal, measurement information of the terminal, speed information of the terminal, and identifier information of the terminal.

3. The random access processing method according to claim 1, wherein if the new 2-step random access process fails, record information of the new 2-step random access process is failure process record information of the new 2-step random access process; if the traditional 4-step random access process fails, record information of the traditional 4-step random access process is failure process record information of the traditional 4-step random access process; and if the traditional 2-step random access process fails, record information of the traditional 2-step random access process is failure process record information of the traditional 2-step random access process.

4. The random access processing method according to claim 1, wherein if the new 2-step random access process succeeds, record information of the new 2-step random access process is success process record information of the new 2-step random access process; if the traditional 4-step random access process succeeds, record information of the traditional 4-step random access process is success process record information of the traditional 4-step random access process; and if the traditional 2-step random access process succeeds, record information of the traditional 2-step random access process is success process record information of the traditional 2-step random access process.

5. The random access processing method according to claim 1, wherein the random access process comprises one or a combination of multiple of the following: a random access process that fails the most recently, a random access process that fails the most recently in a specific geographic location, a random access process that is successfully completed the most recently, and a random access process that is successfully completed the most recently in a specific geographic location; or,
  wherein the random access process comprises one or a combination of multiple of the following: a failed random access process configured by a network, a failed random access process specified in a protocol, a successfully completed random access process configured in a network, and a successfully completed random access process specified in a protocol.

6. A random access processing method, comprising:
  receiving random access process information corresponding to a type of a random access process from a terminal; and
  modifying configuration information of the random access process according to the random access process information;
  wherein the random access process information comprises one or a combination of multiple of the following: random access process type information, random access process trigger event information, and random access process record information;

wherein the random access process record information comprises one or a combination of multiple of the following: record information of a new 2-step random access process, record information of a traditional 4-step random access process, record information of a traditional 2-step random access process, and total record information of a new 2-step random access process and a traditional 4-step random access process;

wherein the record information of the new 2-step random access process comprises one or a combination of multiple of the following: the number of times message A is sent, the number of times sending of message A fails, the number of times receiving of message B fails, the number of times sending of control information of message A fails, the number of times receiving of a response message corresponding to the control information of message A fails, the number of times sending of control information of message A succeeds, the number of times receiving of a response message corresponding to the control information of message A succeeds, the number of times sending of data information of message A fails, the number of times receiving of a response message corresponding to data information of message A fails, the number of times sending of data information of message A succeeds, the number of times receiving of a response message corresponding to data information of message A succeeds, indication information indicating whether contention occurs is detected, the number of times contention is detected, and channel access failure information;

wherein the record information of the traditional 4-step random access process comprises one or a combination of multiple of the following: the number of times message 1 is sent, the number of times sending of message 1 fails, the number of times receiving of message 2 fails, the number of times receiving of message 4 fails, the number of times message 3 is sent, the number of times sending of message 3 fails, indication information indicating whether contention occurs is detected, the number of times contention is detected, and channel access failure information;

wherein the record information of the traditional 2-step random access process comprises one or a combination of multiple of the following: the number of times message 1 is sent, the number of times sending of message 1 fails, the number of times receiving of message 2 fails, indication information indicating whether contention occurs is detected, the number of times contention is detected, and channel access failure information;

wherein the total record information comprises: a sum of the number of times message A is sent in the new 2-step random access process and the number of times message 1 is sent in the traditional 4-step random access process, a sum of the number of times sending of message A fails in the new 2-step random access process and the number of times sending of message 1 fails in the traditional 4-step random access process, a sum of the number of times contention is detected in the new 2-step random access process and the number of times contention is detected in the traditional 4-step random access process, indication information indicating whether the new 2-step random access process falls back to the traditional 4-step random access process is detected, and the number of times the new 2-step random access process falls back to the traditional 4-step random access process;

wherein the random access process information further comprises one or a combination of multiple of the following: geographic location information of the terminal, measurement information of the terminal, speed information of the terminal, and identifier information of the terminal.

7. The random access processing method according to claim 6, wherein the random access process comprises: a failed random access process, and/or, a successfully completed random access process.

8. The random access processing method according to claim 6, further comprising: sending the random access process information to another network node.

9. The random access processing method according to claim 6, wherein the random access process type information comprises one or a combination of multiple of the following: a new 2-step random access process, a traditional 4-step random access process, a traditional 2-step random access process, and a random access process for time information calibration.

10. The random access processing method according to claim 6, wherein the random access process trigger event information comprises one or a combination of multiple of the following: initial access, connection re-establishment, cell switching, downlink data arrives and an uplink of the terminal is in an out-of-synchronization state, uplink data arrives and an uplink of the terminal is in an out-of-synchronization state, terminal state switch, establishing uplink synchronization for a secondary cell, system information request, and beam failure recover.

11. A terminal, comprising a processor, a memory, and a computer program stored in the memory and executable on the processor, wherein when the computer program is executed by the processor, following step is implemented:

reporting random access process information corresponding to a type of a random access process to a network side;

wherein the random access process information comprises one or a combination of multiple of the following: random access process type information, random access process trigger event information, and random access process record information;

wherein if the type of the random access process comprises the new 2-step random access process, the random access process record information comprises record information of the new 2-step random access process;

if the type of the random access process comprises the traditional 4-step random access process, the random access process record information comprises record information of the traditional 4-step random access process;

if the type of the random access process comprises the traditional 2-step random access process, the random access process record information comprises record information of the traditional 2-step random access process; and if the type of the random access process comprises the new 2-step random access process and the traditional 4-step random access process, the random access process record information comprises at least one of the following: record information of the new 2-step random access process, record information of the traditional 4-step random access process, and total record information of the new 2-step random access process
and the traditional 4-step random access process;

wherein the record information of the new 2-step random access process comprises one or a combination of multiple of the following: the number of times message A is sent, the number of times sending of message A fails, the number of times receiving of message B fails, the number of times sending of control information of message A fails, the number of times receiving of a response message corresponding to the control information of message A fails, the number of times sending of control information of message A succeeds, the number of times receiving of a response message corresponding to the control information of message A succeeds, the number of times sending of data information of message A fails, the number of times receiving of a response message corresponding to data information of message A fails, the number of times sending of data information of message A succeeds, the number of times receiving of a response message corresponding to data information of message A succeeds, indication information indicating whether contention occurs is detected, the number of times contention is detected, and channel access failure information; wherein the channel access failure information comprises one or a combination of multiple of the following: indication information indicating whether sending of message A has a channel access failure, the number of times sending of message A has a channel access failure, indication information indicating whether sending of the control information of message A has a channel access failure, the number of times sending of the control information of message A has a channel access failure, indication information indicating whether sending of the data information of message A has a channel access failure, the number of times sending of the data information of message A has a channel access failure, indication information indicating whether receiving of message B has a channel access failure, the number of times receiving of message B has a channel access failure, and information about a frequency that has a channel access failure; wherein the record information of the traditional 4-step random access process comprises one or a combination of multiple of the following: the number of times message 1 is sent, the number of times sending of message 1 fails, the number of times receiving of message 2 fails, the number of times receiving of message 4 fails, the number of times message 3 is sent, the number of times sending of message 3 fails, indication information indicating whether contention occurs is detected, the number of times contention is detected, and channel access failure information; wherein the channel access failure information comprises one or a combination of multiple of the following: indication information indicating whether sending of message 1 has a channel access failure, indication information indicating whether sending of message 3 has a channel access failure, the number of times sending of message 1 has a channel access failure, the number of times sending of message 3 has a channel access failure, indication information indicating whether receiving of message 2 has a channel access failure, indication information indicating whether receiving of message 4 has a channel access failure, the number of times receiving of message 2 has a channel access failure, the number of times receiving of message 4 has a channel access failure, and information about a frequency that has a channel access failure; wherein the record information of the traditional 2-step random access process comprises one or a combination of multiple of the following: the number of times message 1 is sent, the number of times sending of message 1 fails, the number of times receiving of message 2 fails, indication information indicating whether contention occurs is detected, the number of times contention is detected, and channel access failure information; wherein the total record information comprises: a sum of the number of times message A is sent in the new 2-step random access process and the number of times message 1 is sent in the traditional 4-step random access process, a sum of the number of times sending of message A fails in the new 2-step random access process and the number of times sending of message 1 fails in the traditional 4-step random access process, a sum of the number of times contention is detected in the new 2-step random access process and the number of times contention is detected in the traditional 4-step random access process, indication information indicating whether the new 2-step random access process falls back to the traditional 4-step random access process is detected, and the number of times the new 2-step random access process falls back to the traditional 4-step random access process.

12. The terminal according to claim 11, wherein the random access process type information comprises one or a combination of multiple of the following: a new 2-step random access process, a traditional 4-step random access process, a traditional 2-step random access process, and a random access process for time information calibration; or wherein the random access process trigger event information comprises one or a combination of multiple of the following: initial access, connection re-establishment, cell switching, downlink data arrives and an uplink of the terminal is in an out-of-synchronization state, uplink data arrives and an uplink of the terminal is in an out-of-synchronization state, terminal state switch, establishing uplink synchronization for a secondary cell, system information request, and beam failure recover; or wherein the random access process information further comprises one or a combination of multiple of the following: geographic location information of the terminal, measurement information of the terminal, speed information of the terminal, and identifier information of the terminal.

13. The terminal according to claim 11, wherein
if the new 2-step random access process fails, record information of the new 2-step random access process is failure process record information of the new 2-step random access process;
if the traditional 4-step random access process fails, record information of the traditional 4-step random access process is failure process record information of the traditional 4-step random access process; and
if the traditional 2-step random access process fails, record information of the traditional 2-step random access process is failure process record information of the traditional 2-step random access process.

14. The terminal according to claim 11, wherein
if the new 2-step random access process succeeds, record information of the new 2-step random access process is success process record information of the new 2-step random access process;

if the traditional 4-step random access process succeeds, record information of the traditional 4-step random access process is success process record information of the traditional 4-step random access process; and if the traditional 2-step random access process succeeds, record information of the traditional 2-step random access process is success process record information of the traditional 2-step random access process.

15. The terminal according to claim 11, wherein
the random access process comprises one or a combination of multiple of the following:

a random access process that fails the most recently, a random access process that fails the most recently in a specific geographic location, a random access process that is successfully completed the most recently, and a random access process that is successfully completed the most recently in a specific geographic location;

or, wherein the random access process comprises one or a combination of multiple of the following: a failed random access process configured by a network, a failed random access process specified in a protocol, a successfully completed random access process configured in a network, and a successfully completed random access process specified in a protocol.

16. A network device, comprising a processor, a memory, and a computer program stored in the memory and executable on the processor, wherein when the computer program is executed by the processor, steps of the random access processing method according to claim 6 are implemented.

17. The network device according to claim 16, wherein the random access process comprises: a failed random access process, and/or, a successfully completed random access process.

18. The network device according to claim 16, wherein when the computer program is executed by the processor, following step is implemented:

sending the random access process information to another network node.

19. The network device according to claim 16, wherein the random access process type information comprises one or a combination of multiple of the following: a new 2-step random access process, a traditional 4-step random access process, a traditional 2-step random access process, and a random access process for time information calibration.

20. The network device according to claim 16, wherein the random access process trigger event information comprises one or a combination of multiple of the following: initial access, connection re-establishment, cell switching, downlink data arrives and an uplink of the terminal is in an out-of-synchronization state, uplink data arrives and an uplink of the terminal is in an out-of-synchronization state, terminal state switch, establishing uplink synchronization for a secondary cell, system information request, and beam failure recover.

* * * * *